United States Patent [19]

Yamamoto

[11] Patent Number: 5,617,691
[45] Date of Patent: Apr. 8, 1997

[54] FITTING STRUCTURE OF RECTANGULAR PARALLELOPIPEDAL BLOCKS

[75] Inventor: Ken Yamamoto, Nerima-ku, Japan

[73] Assignee: Doryokuro Kakunenryo Kaihatsu Jigyodan, Tokyo-to, Japan

[21] Appl. No.: 422,308

[22] Filed: Apr. 13, 1995

[30] Foreign Application Priority Data

Apr. 22, 1994 [JP] Japan .................................. 6-084380

[51] Int. Cl.$^6$ ........................................................ E04B 5/04
[52] U.S. Cl. ............................... 52/604; 52/603; 52/605; 52/609; 446/125
[58] Field of Search ............................. 52/603, 604, 605, 52/609; 446/117, 125, 128

[56] References Cited

U.S. PATENT DOCUMENTS

| | | | |
|---|---|---|---|
| 1,023,785 | 4/1912 | McGettigan | 52/605 |
| 1,945,681 | 2/1934 | Farrens | 53/605 X |
| 2,132,757 | 10/1938 | Paulson | 446/117 X |
| 4,532,748 | 8/1985 | Rotherham | 52/605 |
| 4,627,764 | 12/1986 | Scheiwiller | 52/605 X |
| 4,787,185 | 11/1988 | Gascho | 52/605 X |
| 4,936,712 | 6/1990 | Glickman | 52/604 X |
| 5,188,221 | 2/1993 | Bertrand | 446/128 X |

FOREIGN PATENT DOCUMENTS 0379389  7/1990  European Pat. Off. ............... 446/125

*Primary Examiner*—Wynn E. Wood
*Attorney, Agent, or Firm*—Wenderoth, Lind & Ponack

[57] ABSTRACT

A fitting structure of a plurality of rectangular parallelopipedal blocks comprising concavo-convexities formed on the surfaces of each of the blocks. The concavo-convexities are formed on each surface of the block on the basis of a figure which is in symmetry of rotation per 90° round the center of a regular square or is in symmetry of rotation per 180° round the center of a rectangle, and is complementarily in symmetry of axis with respect to a center of the rectangle line passing through the center and being in parallel with a side of the regular square or rectangle. Predetermined congruence is imparted to the figures on the surfaces depending on various shapes of the blocks. Fitting of the concavo-convexities of the surfaces of the adjacent blocks is always ensured when each block is aligned so that its thickness and its length are in conformity. The surfaces of adjacent blocks can be connected without the necessity of considering the direction of each block.

8 Claims, 2 Drawing Sheets

FITTING STRUCTURE OF RECTANGULAR PARALLELOPIPEDAL BLOCKS

BACKGROUND OF THE INVENTION

The present invention relates to rectangular parallelopipedal blocks capable of interfitting without considering the direction of each block to be connected. A large number of rectangular parallelopipedal blocks having the same shape and the same size and having concavities and convexities formed on the surfaces thereof are aligned and connected by interfitting adjacent surfaces.

Construction of structures by aligning and connecting a large number of rectangular parallelopipedal blocks has been utilized for the production of walls, block walls, and so forth. Particularly when radioactive shield walls are produced by using lead, graphite, concrete, etc., in the field of nuclear power, a block structure has been utilized. Also, in the field of toys, block toys are used for making and assembling products of various shapes by connecting a large number of small blocks.

When a large number of blocks are to be aligned and connected, concavo-convexities are formed on the surfaces of each block so that adjacent surfaces can be fitted to one another and adhesion between the blocks can be improved by eliminating the gap between the adjacent blocks.

However, in order to insure smooth fitting of the concavo-convexities on the surfaces of adjacent blocks, it is necessary to fit them by confirming, one by one, the longitudinal direction, the transverse direction and the vertical direction of each block. The work of confirming the directions or orientation of each block is troublesome.

SUMMARY OF THE INVENTION

The present invention is directed to the situation where a large number of rectangular parallelopipedal blocks having the same shape, the same size, and concavo-convexities formed on the surfaces thereof are to be aligned and connected with one another. The present invention is directed to providing a fitting structure for rectangular parallelopipedal blocks which always ensures successful fitting between the concavo-convexities of the surfaces of the adjacent blocks without the necessity for confirming the directions of each block.

The fitting structure of a plurality of rectangular parallelopipedal blocks according to the present invention comprises patterns of concavo-convexities formed on the surfaces of each of the rectangular parallelopipedal blocks having the same shape and the same size. The form of the concavo-convexities is based on a figure which is determined under the following three conditions.

First, when the rectangular parallelopipedal blocks are cubes (FIG. 1), the pattern of concavo-convexities are formed on the basis of a figure which has symmetry of rotation at every 90° round the center of a regular square on each surface. In other words, the figure will coincide or be superimposed on the exact figure when imaginarily rotated 90° about the center of the surface. The figure also has complementarily symmetry of axis with respect to a center line passing through the center and being in parallel with a side of the regular square. The figures on the six regular square surfaces are all congruent.

Second, when a pair of opposed surfaces of the rectangular parallelopipedal block are regular squares and the other two pairs of opposed surfaces are rectangles (FIG. 5), for each surface of the pair of regular squares, the pattern of concavo-convexities are formed on the basis of the figure which has symmetry of rotation at every 90° round the center of the regular square and has complementarily symmetry of axis with respect to the center line passing through the center and being in parallel with a side of the regular square.

For each surface of the two pairs of rectangles, the pattern of concavo-convexities are formed on the basis of a figure which has symmetry of rotation at every 180° round the center of the rectangle and has complementarily symmetry of axis with respect to the center line passing through the center and being in parallel with a side of the rectangle.

The figures on the surfaces of the pair of regular squares are mutually congruent, and the figures on the surfaces of the two pairs of rectangles are all congruent.

Third, when three pairs of opposed surfaces of the rectangular parallelopipedal blocks are all rectangles (FIG. 9), the pattern of concavo-convexities are formed on the basis of the figure which has symmetry of rotation at every 180° round the center of the rectangle on each surface and has complementarily symmetry of axis with respect to a center line passing through the center and being in parallel with a side of the rectangle. The figures on the surfaces of the three pairs of rectangles may be congruent for each pair.

Because the concavo-convex portions are formed on the surfaces of the rectangular parallelopipedal blocks on the basis of the figures described above, the concavities and the convexities always interfit with one another on the contact surfaces of the adjacent blocks by merely aligning and connecting the blocks in such a manner as to bring the thickness and the length of each block into conformity without the necessity of considering the longitudinal, transverse and vertical directions of each block.

PREFERRED EMBODIMENTS OF THE INVENTION

Figure 1:
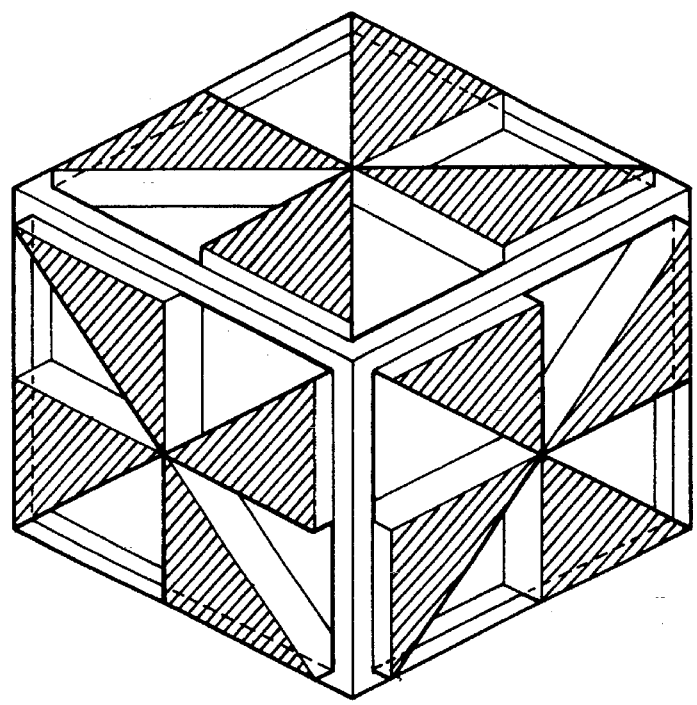
FIG. 1 is a perspective view of an embodiment in which the present invention is applied to a cubic block.

This invention will be further explained hereinbelow with reference to embodiments thereof shown in the drawings.

FIG. 1 shows an embodiment wherein concavo-convexities are formed on each surface of a cubic block having all the sides thereof equal to one another. Hatched portions represent convexities so formed as to protrude by a predetermined height from the block surface and white portions represent concavities so formed as to be recessed by a predetermined depth (corresponding to the height of convexity) from the block surface. In the case of a cube, there is no distinction between the upper, front and side surfaces. Therefore, the six surfaces must be congruent to one another and must have the same figure.

Figure 2:
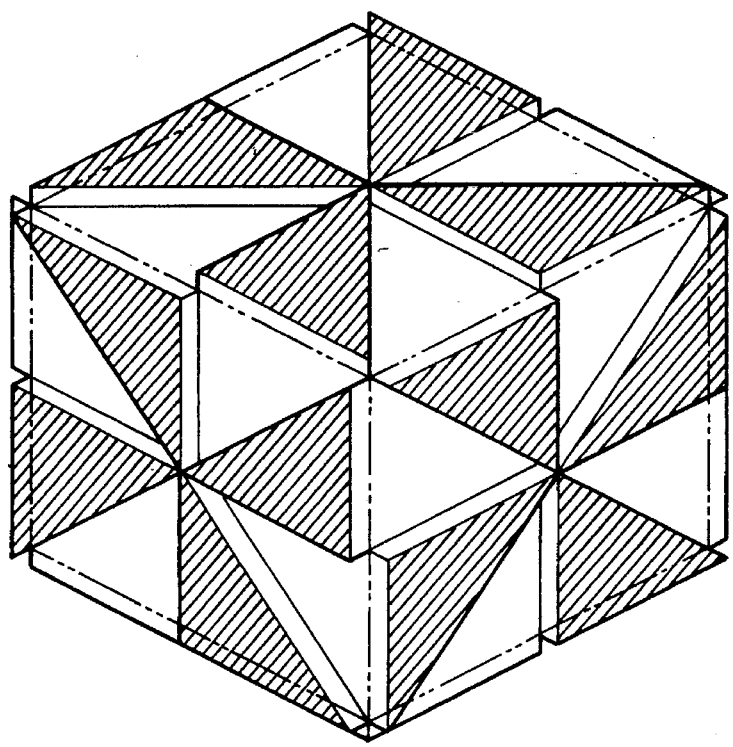
FIG. 2 is a perspective view of another embodiment in which the present invention is applied to a cubic block.

In the embodiment shown in FIG. 1, the concavo-convexities of each surface are formed at positions somewhat spaced apart from each side of the cubic block. However, it is also possible to extend the positions of the concavo-convexities to each side of the cubic block, to form only the convexities in such a manner as to protrude by a predetermined height from the block surface and to keep the concavities at the same level as that of the block surface, as shown in FIG. 2. Two-dot-chain lines in FIG. 2 represent imaginary lines illustrating the positions of the sides of the cubic block.

Figure 3:
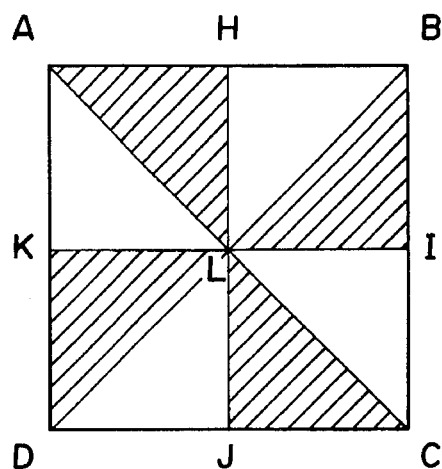
FIG. 3 shows an example of the figures which can be used for forming concavo-convexities on the square surfaces of a block.
Figure 4:
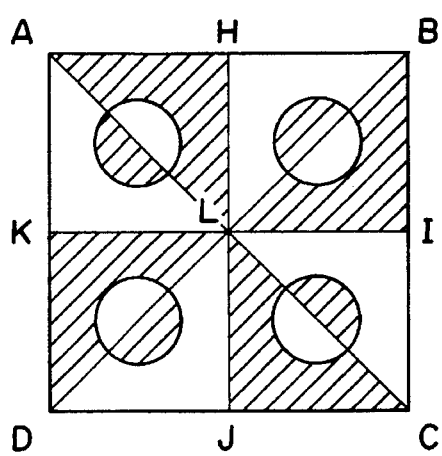
FIG. 4 shows another example of the figures which can be used for forming concavo-convexities on the square surface of a block.

The FIG. 3 represents the relationship between the convexities (hatched portions) and the concavities (white portions) on one of the surfaces of the cubic block shown in FIGS. 1 and 2. This figure is in symmetry of rotation per 90° round the center L of the regular square ABCD and is complementarily in symmetry of axis with respect to the center line IK or HJ which passes through the center L and is in parallel with the side AB or the side BC. FIG. 4 shows another example of a figure representing the relationship of concavo-convexity as the figure has symmetry and complementariness similar to those shown in FIG. 3.

Figure 6:
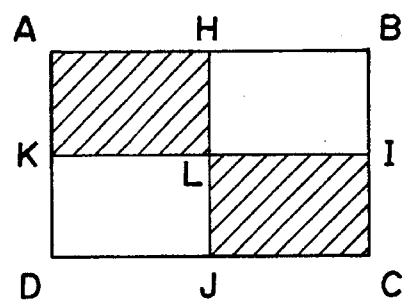
FIG. 6 shows an example of the figures which can be used for forming concavo-convexities on rectangular surfaces of a block.
Figure 7:
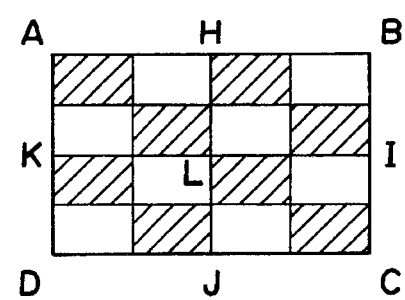
FIG. 7 shows another example of the figures which can be used for forming concavo-convexities on rectangular surfaces of a block.
Figure 5:
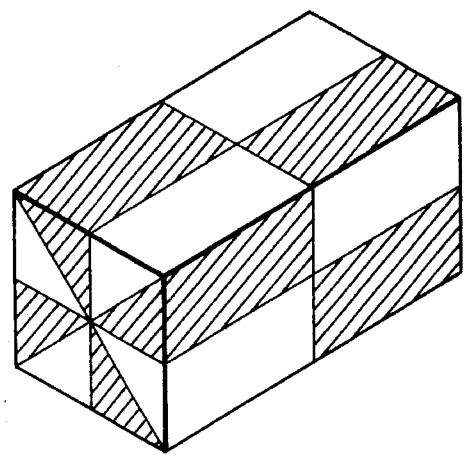
FIG. 5 is a perspective view of an embodiment in which the present invention is applied to a rectangular parallelopipedal block having a pair of opposed surfaces which are regular squares.
Figure 8:
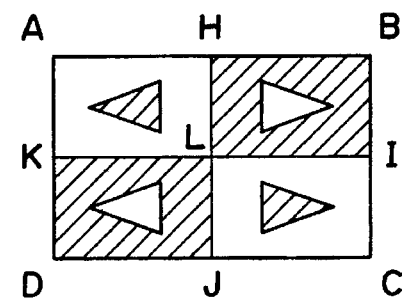
FIG. 8 shows still another example of the figures which can be used for forming concavo-convexities on rectangular surfaces of a block.

FIG. 5 shows another embodiment wherein the present invention is applied to a rectangular parallelopipedal block having a pair of opposed surfaces of which are regular squares and two other pairs of opposed surfaces of which are rectangles. In FIG. 5, for convenience the concavo-convexities are expressed by the hatched portions representing the convexities and the white portions representing the concavities because the drawing becomes unusually complicated if the concavo-convexities are actually expressed in the same way as in FIG. 1 or 2. In this case, the figures on the surfaces of the pair of regular squares have symmetry and complementariness similar to those in FIGS. 3 and 4. The figures on the respective surfaces of the regular squares are mutually congruent. On the other hand, as shown in FIGS. 6, 7 and 8, the figures on the surfaces of the two pairs of rectangles are in symmetry of rotation per 180° round the center L of the rectangle ABCD and is complementarily in symmetry of axis with respect to the center line IK or HJ which passes through the center L and is in parallel with the side AB or BC. The figures on each surface of the respective rectangles are all congruent. Though the figures shown in FIGS. 3 and 4 are in symmetry of rotation per 90°, they satisfy also the condition that they are in symmetry of rotation per 180°. Accordingly, these figures can be used for each surface of the rectangles.

Figure 9:
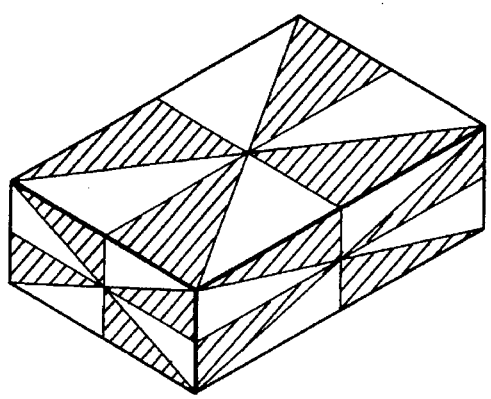
FIG. 9 is a perspective vies of an embodiment in which the present invention is applied to a rectangular parallelopipedal block all the three pairs of opposed surfaces of which are rectangles.

FIG. 9 shows still another embodiment wherein the concavo-convexities according to the present invention are formed on a rectangular parallelopipedal block, the three pairs of opposed surfaces of which are all rectangles. In this case, the figures on the surfaces of the rectangles must all have symmetry and complementariness in the same way as in FIGS. 6, 7 and 8, but the figures having symmetry of rotation per 90° such as those shown in FIGS. 3 and 4 can be used in the same way as described above. The figures on the surfaces of these three pairs of rectangles need only satisfy the condition that the figures of one opposed pair be mutually congruent.

As can be understood from the explanation given above, in the case where a large number of rectangular parallelopipedal blocks having the same dimension and the same shape are aligned and connected, the convexities and the concavities can always be fitted to one another on the surfaces of adjacent blocks. By forming the concavo-convexities according to the present invention on each surface of the block, the necesity of allowing for the directions of the adjacent blocks when they are to be connected is eliminated. As a result, the blocks can be connected and fitted to one another in any direction.

What is claimed is:

1. A rectangular parallelopipedal block for fitting with substantially identical blocks, said block comprising:

six rectangular exterior surfaces defining three pairs of opposed rectangular surfaces; and a pattern of concavities and convexities formed on each of said six rectangular surfaces of said block, each of said patterns of concavities and convexities has a symmetry of rotation of at least every 180 degrees around the center of said rectangular surface, respectively, and a complementary symmetry of axis with respect to a center line passing through the center and being parallel with a side of said respective rectangular surface, wherein each said pattern of concavities and convexities of at least one of said pairs of opposed rectangular surfaces has a symmetry of rotation at every 90 degrees around the center of said respective rectangular surface, and said patterns of concavities and convexities of each pair of rectangles are congruent.

2. The block as claimed in claim 1, wherein:

said rectangular parallelopipedal block is a cube and said six rectangular surfaces are six square surfaces;

said patterns of concavities and convexities of said square surfaces all have a symmetry of rotation at every 90 degrees around the center of said square surfaces, respectively; and said patterns of concavities and convexities on said six surfaces of said cube are all congruent.

3. The block as claimed in claim 1, wherein:

said rectangular parallelopipedal block has a length and a width, and said length is greater than said width;

said at least one of said pairs of opposed rectangular surfaces comprises a pair of regular squares;

said patterns of concavities and convexities on said pair of squares are mutually congruent; and said patterns of concavities and convexities on said rectangles of said two pairs of rectangles are all congruent.

4. A rectangular parallelopipedal block for fitting with substantially identical blocks, said block comprising:

six rectangular exterior surfaces defining three pairs of opposed rectangular surfaces, each of said surfaces has a length and a width which is less than said length; and a pattern of concavities and convexities formed on each of said six rectangular surfaces of said block, each of said patterns of concavities and convexities has a symmetry of rotation of at least every 180 degrees around the center of said rectangular surface, respectively, and a complementary symmetry of axis with respect to a center line passing through the center and being parallel with a side of said respective rectangular surface, wherein said patterns of concavities and convexities of each pair of rectangles are congruent.

5. A plurality of interfitting rectangular parallelopipedal blocks, each said block comprising:

six exterior rectangular surfaces defining three pairs of opposed rectangular surfaces;

a pattern of concavities and convexities formed on each surface of said three pairs of opposed rectangular surfaces, each of said patterns of concavities and convexities has a symmetry of rotation at least at every 180 degrees around the center of said rectangular surface, respectively, and a complementary symmetry of axis with respect to a center line passing through the center and being parallel with a side of said respective rectangular surface, wherein each said pattern of concavities and convexities of at least one of said pairs of opposed rectangular surfaces has a symmetry of rotation at every 90 degrees around the center of said respective rectangle, and said patterns of concavities and convexities of each said pair of surfaces are congruent so that when the length and the width of one of said plurality of blocks are aligned with the length and the width of another one of said plurality blocks, said blocks can be interfit without regard to the radial orientation of said blocks.

6. The plurality of interfitting blocks as claimed in claim 5, wherein:

each of said rectangular parallelopipedal blocks is a cube which has six square surfaces;

said patterns of concavities and convexities of said square surfaces all have a symmetry of rotation at every 90 degrees around the center of said square surfaces, respectively; and said pattern of concavities and convexities on said six surfaces of each said cube are all congruent.

7. The plurality of interfitting blocks as claimed in claim 5, wherein:

each of said rectangular parallelopipedal blocks has a length and a width, and said length is greater than said width;

said at least one pair of opposed rectangular surfaces comprises a pair of opposing regular squares, and said patterns of concavities and convexities on said pair of regular squares are mutually congruent and said patterns of concavities and convexities on said four surfaces of said two pairs of rectangles are all congruent.

8. A plurality of interfitting rectangular parallelopipedal blocks, each said block comprising:

six exterior rectangular surfaces defining three pairs of opposed rectangular surfaces, each of said surfaces has a length and a width which is less than said length;

a pattern of concavities and convexities formed on each surface of said three pairs of opposed rectangular surfaces, each of said patterns of concavities and convexities has a symmetry of rotation at least at every 180 degrees around the center of said rectangular surface, respectively, and a complementary symmetry of axis with respect to a center line passing through the center and being parallel with a side of said respective rectangular surface, wherein said patterns of concavities and convexities of each said pair of surfaces are congruent so that when the length and the width of one of said plurality of blocks are aligned with the length and the width of another one of said plurality of blocks, said blocks can be interfit without regard to the radial orientation of said blocks.

* * * * *